Dec. 7, 1943.    M. L. PIKER    2,336,292
PROCESS FOR FORMING DECORATIVE SHEETING
Filed Feb. 4, 1941
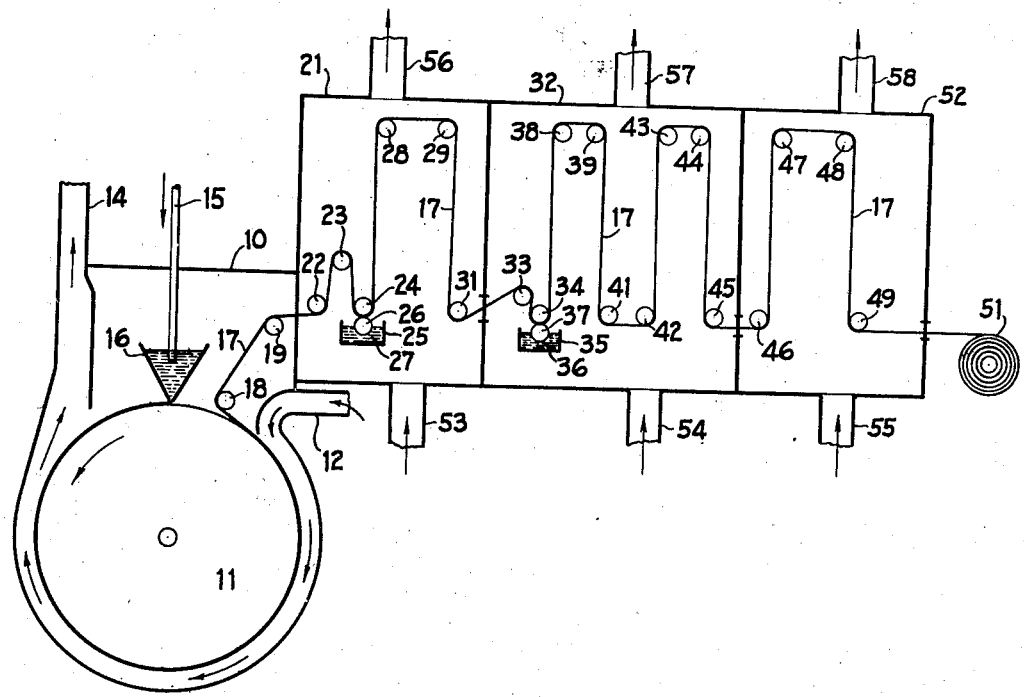
MAURICE L. PIKER
INVENTOR
BY
ATTORNEYS Patented Dec. 7, 1943

2,336,292

UNITED STATES PATENT OFFICE 2,336,292

PROCESS FOR FORMING DECORATIVE SHEETING

Maurice L. Piker, Rochester, N. Y., assignor to Eastman Kodak Company, Rochester, N. Y., a corporation of New Jersey Application February 4, 1941, Serial No. 377,351

13 Claims. (Cl. 117—63)

This invention relates to cellulose derivative sheeting and more particularly an improved method of applying and fixing a coating thereon.

As is well known, cellulose derivative sheeting has found wide use in numerous fields which formerly employed paper. As illustrative, without limiting the invention, one of these fields in which cellulose ester sheeting has made great inroads and has had considerable popularity is that of paper lampshades.

Some of the advantages possessed by the cellulose derivative sheeting over paper are that, the ester sheeting may be washed, it has no fibrous surface to which dust tends to collect, it is tougher and more resistant to breaking. Dyes and pigments may be incorporated in the cellulose derivative solution from which the sheeting is formed thereby dispensing with the need of printing colors on the paper, and it may be lacquered. By control of the dyes and pigments added to the solution from which the sheeting is formed variations from a transparent to an opaque sheet may be produced.

While the colored pigments and dyes may be incorporated in the sheeting, per se, for example, by the method disclosed in Couch et al. Patent 2,039,708 of May 5, 1936, the coloring effect desired by different customers varies considerably and, therefore, it is more economical to make the sheeting by a somewhat different process.

It was decided that greater economies could be made by forming an uncolored base sheet and then coloring this sheet with a colored overcoat in the color desired by the purchaser. By such a method a large variety of tints and colors could be easily produced while employing only one composition for the supporting sheet.

The base sheet may be made according to standard procedure such as by flowing a solution containing the cellulose derivative and plasticizer onto a moving smooth surface and progressively evaporating the solvent from the solution to form a thin, continuous sheet.

The colored coating may be applied to this sheet with a bead applicator. In this device the sheet is passed across but out of contact with a rotating roll which transfers the coating solution from a supply in a pan to the sheet; the solution forming a "bead" between the upper surface of the roll and the sheet.

In coating sheeting with a bead applicator there is usually a problem of eliminating cross lines and streaks in the coating. Cross lines and streaks may be functions of the mechanical equipment and are also functions, in some cases, of the solution being coated. In general, the best control for those caused mechanically is in having smooth running equipment which is free from vibration.

Entirely different from these factors, and in addition to them, is the matter of controlling quality of the coating by a choice of solvents. As is described more fully in the following paragraphs, one of the preferred methods employed in applying pigmented coating solutions or "subs" to the cellulose derivative sheet includes directing a stream of air against the coating. I found if the solvents of the applied sub are essentially low boiling, the dried coating reflects the fact that the drying air is not always uniform in velocity or in direction. The pigment coating is inclined to "pile up" in local areas, resulting in blotchiness or thicker deposits of sub, thereby giving darker color in local areas. The coating also tends to deposit in more or less regular lines across the support in a pattern somewhat governed by vibration and air flow.

On the other hand, while the use of high boiling solvents in place of low boiling solvents modifies the tendency of pigmented coatings to "set up" due to uneven application, high boiling solvents have little quick "attack power" for the base itself. Accordingly, I found that the sub coating is not anchored firmly to the base and can be stripped therefrom very easily. The adherence of the coating, therefore, is less than that required for sheeting to be fabricated into lamp shades.

An object, therefore, of the present invention is a process for uniformly coating pigmented and colored coatings onto cellulose derivative sheeting, which may among other uses be employed in the manufacture of decorative lamp shades.

Another object of the invention is a process for uniformly coating adherent pigmented and colored coatings onto cellulose derivative sheeting.

Still another object is a process whereby a smooth, uniform but non-firmly adhering decorative layer is coated onto a cellulose derivative sheeting and is then overcoated with another solution which will cause the decorative layer to adhere tenaciously to the base sheeting.

In accordance with one feature of the invention these and other objects are attained by coating a continuous strip of cellulose derivative sheeting with a pigmented and/or dyed coating which is in solution in a solvent mixture containing relatively high boiling solvents. The coating may be applied by a bead applicator apparatus which is preferably mounted in a drying chamber through which air at an elevated temperature is passed. The solvent mixture containing the high boiling solvent is thus uniformly dissipated from the coating solution leaving a smooth decorative coating on the sheeting. The adherence of this coating is rather slight and to cause it to adhere more firmly, the coated sheet is treated with a low boiling solvent or solvent mixture. This solvent has a strong and quick solvent action for the coating and the sheet and thus anchors the coating to the sheet. The solvent may also be applied by a bead applicator apparatus similarly mounted in the drying chamber. After curing the coating will tenaciously adhere to the base sheet.

In accordance with another feature of the invention the colored decorative layer may be anchored to the sheeting and at the same time a protective overcoating for the decorative layer may be applied. This may be done by adding to the low boiling solvent or solvents a cellulose derivative which on evaporation of the solvents will adhere to the decorative layer.

In accordance with still another feature of the invention the surface of the overcoating on the decorative layer may be made either a matte surface or a glossy surface. If a matte surface is desired, a small amount of pigment may be incorporated in the overcoating solution. If a glossy surface is desired the pigment may be omitted in the overcoating solution.

The invention will be further understood by reference to the following detailed description and attached drawing which schematically shows the arrangement of apparatus preferably employed in forming and coating cellulose derivative sheeting.

As shown in the drawing there is an enclosed system for forming and coating cellulose derivative sheeting comprising an enclosed sheet forming chamber 10 in which a rotatable drum 11 is positioned. A gas or air inlet 12 permits air to flow into and around the drum 11 in a clockwise direction and countercurrent to the path of the solution which forms the sheet 17. The air leaves the chamber by outlet 14. The cellulose derivative solution from which the sheet is formed is introduced through conduit 15 to hopper 16. The solution flows through an elongated slot in the bottom of the hopper onto the slowly revolving drum 11 which is heated sufficiently to cause initial evaporation of the solvents from the solution. As the solution on the drum 11 is carried along its meets the countercurrent air flow and further solvent is evaporated from the solution. The solvent is swept out of the chamber by the air through outlet 14. Somewhere in the course of the rotation of drum 11 sufficient solvent has been expelled to permit the formation of a cellulose derivative sheet and this sheet 17 is removed by stripping roll 18 and conducted over guide roll 19 to the associated drying cabinet 21. Here the sheet 17 is passed under guide roll 22 over guide roll 23 and under guide roll 24. A bead applicator apparatus is positioned beneath guide roll 24. This apparatus comprises pan 25 and applicator roll 26 which revolves partially immersed in the decorative coating solution 27. The applicator roll 26 is adjusted to be just out of contact with the sheet 17 as it passes around guide roll 24. However, this distance is small enough to permit a bead of the solution to contact the sheet across the length of applicator roll 26. The sheet thus becomes coated on its under side with the coating which, in accordance with the invention, is but superficially attached to the base sheet 17. The sheet 17 progresses through the drying chamber and the coating is dried thereon by solvent evaporation. The path of the sheet is over guide rolls 28, 29, and under guide roll 31.

From guide roll 31 the sheet passes into the adjacent drying chamber 32 where it passes over guide roll 33 and under guide roll 34. Beneath guide roll 34 there is positioned another bead applicator apparatus comprising a pan 35, containing an anchoring solution 36 and having a rotatable applicator roll 37 partially immersed in the solution. As above described the solution is carried by applicator roll 37 to contact the sheet 17 as it passes under guide roll 34. This solution anchors the decorative coating on the base sheet 17 and, depending on the composition of the solution, a protective overcoating which gives a glossy or matte finish may simultaneously be added. After this operation the sheet passes through the drying chamber over rolls 38 and 39, under rolls 41 and 42, over rolls 43 and 44 and under roll 45 into drying chamber 52 where it may be further cured as it passes through the chamber on the guide rolls 46, 47, 48 and 49. The sheet 17 then leaves the drying chamber 52 and is wound upon reel 51. It will be noted that drying chambers 21, 32 and 52 have air entry ports 53, 54 and 55, and air exit ports 56, 57 and 58.

It will be understood that various types of cellulose derivative sheets may be made and coated in accordance with my invention. Cellulose nitrate, cellulose acetate, mixed esters such as cellulose acetate propionate and cellulose acetate butyrate; cellulose ethers such as methyl, ethyl, and benzyl cellulose, may be the base for the sheeting.

The following high boiling solvents may be employed, if desired, in preparing the colored coating solution:

Methyl Cellosolve
Methyl Cellosolve acetate
Butyl Cellosolve
Diacetone alcohol
Butyl alcohol
Ethyl lactate
Butyl lactate
Amyl acetate
Butyl acetate With these high boiling solvents I may employ one or more of the following low boiling solvents:

Acetone
Ethyl acetate
Methyl acetate
Methyl alcohol
Ethyl alcohol
Ethylene dichloride
Methylene dichloride As will be apparent from the above list of solvents by high boiling solvents, I mean solvents having boiling points above 100° C. and in a range of approximately 125° to 200° C. By low boiling solvents I mean solvents which have a boiling point less than 100° C. and approximately within the range of 40° to 80° C.

*Example 1*

The invention may be illustrated with a cellulose acetate sheet containing as plasticizer 32% diethyl phthalate based on the weight of the cellulose acetate. Such a sheet may be formed by putting the ester and plasticizer in solution in about 400 parts of acetone. This solution is coated onto the drum 11 and an integral transparent sheet is formed. It may be stripped from the drum and passed through the drying chamber 21.

Example 2

If it is desired to form a white translucent coating on this cellulose acetate sheet a solution containing:

| | Per cent |
|---|---|
| Cellulose nitrate | 2 |
| Titanox (TiO$_2$) | 2 |
| Butyl alcohol | 35 |
| Methyl alcohol | 15 |
| Acetone | 30 |
| Methyl Cellosolve | 16 | may be placed in the first bead applicator in cabinet 21. The solution is maintained at approximately 60° F. by means such as a hot water coil, not shown. The atmosphere in this cabinet is maintained at about 135° F. by air being passed into the cabinet at about this temperature. The pigmented coating superficially attached itself to the cellulose acetate sheet and excess solvent is driven off in chamber 21. From chamber 21 the sheet now coated with the pigment, enters heating chamber 32 and the pigmented side of sheet 17 passes over the bead applicator roll 37 and a thin layer of "anchoring" solvents is applied to the pigmented side.

Example 3

A suitable solution for use in affixing the above described pigmented layer to the cellulose acetate sheeting is the following:

| | Per cent |
|---|---|
| Acetone | 75 |
| Methyl alcohol | 15 |
| Methyl Cellosolve | 10 |

The solution may be maintained in the applicator at approximately 75° F. by means such as hot water coil not shown.

The sheet 17 now having the pigmented coating on one surface and a layer of penetrating solvent thereover continues its travel through the drying chamber 32 the atmosphere of which is maintained at about 150° F. In the course of this travel the solvent penetrates the pigmented layer and forms a tenacious bond between the cellulose acetate sheet and the pigmented coating. The solvent is then expelled from the sheet by the heat of the atmosphere in chamber 32 and the sheet may be further cured in chamber 52 where the atmosphere temperature may be approximately 160° F.

Other suitable colored coatings which may be applied to a cellulose acetate sheet made of the composition disclosed in Example 1 are:

Example 4

| | Per cent |
|---|---|
| Cellulose nitrate | 2 |
| Prussian blue | 2 |
| Butyl alcohol | 35 |
| Methyl alcohol | 15 |
| Acetone | 30 |
| Methyl Cellosolve | 16 |

Example 5

| | Per cent |
|---|---|
| Cellulose acetate (acetyl content 30%) | 2 |
| Titanox (TiO$_2$) | 2 |
| Butyl alcohol | 35 |
| Methyl alcohol | 15 |
| Acetone | 30 |
| Methyl Cellosolve | 16 |

As above indicated the base sheet 17 may be made from other cellulose derivatives. If the sheet has a cellulose nitrate base it may be coated by either of the pigmented solutions shown in Examples 2 and 4. In that case, I may employ an anchoring solution of the following composition:

Example 6

| | Per cent |
|---|---|
| Acetone | 20 |
| Ethyl alcohol | 20 |
| Methyl alcohol | 60 |

In some respects this solution is more desirable than that disclosed in Example 3 but, however, the latter solution may also be employed.

I have found by employing my novel process that the applied layers are more uniform in thickness and have fewer smears or visual defects than if applied, as formerly, from solutions in which the solvents were of a lower boiling type and had higher dissolving power for the base. They also have improved adherence and do not abrade easily.

The pigmented coatings in general result in placing a matte finish on the coated side of the sheet. However, if a smooth glossy surface is desired, a suitable filler may be added to the anchoring solution. This can be done to any type of applied layer or any type of base. An example of such glossy overcoating is:

Example 7

| | Per cent |
|---|---|
| Cellulose nitrate | 2 |
| Acetone | 70 |
| Methyl alcohol | 28 |

This coating will also serve as a protective layer for the underlying pigmented coating. If a matte protective overcoating is desired ½% Titanox or other such pigment may be added to the composition shown in Example 7.

The process is also applicable to applying a dye or mixtures of dyes to various cellulose derivative sheets. For example, if it is desired to apply a cellulose acetate propionate overcoating to a cellulose acetate propionate sheet to which has been applied a solution containing a dye, I may use the following solution for applying the dye.

Example 8

| | Per cent |
|---|---|
| Ethylene dichloride | 60 |
| Ethyl alcohol | 20 |
| Methyl Cellosolve | 10 |
| Dye (Zapon yellow Nacelan violet) | 10 |

The dyed surface of the sheet may be affixed to the sheet and at the same time coated with a protective layer such as:

Example 9

| | Per cent |
|---|---|
| Cellulose acetate propionate | 5 |
| Ethylene chloride | 70 |
| Acetone | 25 |

In a similar manner a dye may be applied to a cellulose ether base sheeting. If a cellulose ether sheet such as an ethyl cellulose sheet containing 48 to 50% ethoxy groups is to be dyed and a protective overcoating added, I may apply the dye from the following solution:

Example 10

| | Per cent |
|---|---|
| Zapon yellow | 10 |
| Ethylene dichloride | 30 |
| Methyl alcohol | 10 |
| Benzene | 10 |

This solvent is sufficient to attach the dye loosely to the surface of the base. The dyed layer may be anchored to the base by an overcoating of the following solution:

Example 11

| | Per cent |
|---|---|
| Ethylene dichloride | 85 |
| Methyl alcohol | 10 |
| Ethyl cellulose | 5 |

While the temperatures of the pigmented solutions and the anchoring or overcoating may vary somewhat with different compositions, in general the temperatures of the solution being applied is within the range of 50 to 70° F., and the temperature of the surrounding atmosphere is from 130 to 160° F.

I claim:

1. The method of forming colored cellulose derivative sheeting which comprises coating the sheeting by applying thereto a coloring material in a solvent which has only slight solvent action on the sheeting, drying the coating, and fixing the coating to the sheeting by wetting the coated sheeting with a solvent which has solvent action for both the sheeting and the coating.

2. The method of forming colored cellulose derivative sheeting which comprises coating the sheeting by applying thereto a coloring material in a solvent which has only slight solvent action on the sheeting, drying the coating, and fixing the coating to the sheeting by applying a solvent over the coating which penetrates the coating and has a good solvent action upon both the sheeting and the coating.

3. The method of forming colored cellulose derivative sheeting which comprises coating the sheeting by applying thereto a coloring material in a solvent which has has only slight solvent action on the sheeting, drying the coating, and protecting and fixing the coating to the sheeting by applying a cellulose ester solution over the coating, the solvent of which has good solvent action for the sheeting and the coating and the base of which covers the colored layer.

4. The method of forming colored cellulose derivative sheeting which comprises coating the sheeting by applying thereto a colored pigment in a solvent which has only slight solvent action on the sheeting, drying the coating, and fixing the coating to the sheeting by applying a solvent over the coating which has good solvent action for the sheeting and the pigmented coating.

5. The method of forming colored cellulose ester sheeting which comprises coating the sheeting by applying thereto a coloring material in a solvent which has only slight solvent action on the sheeting, drying the coating, and fixing the coating to the sheeting by applying a solvent over the coating which has good solvent action for both the sheeting and the coating.

6. The method of forming colored cellulose acetate sheeting which comprises coating the sheeting by applying thereto a coloring material containing titanium dioxide in a solvent solution which has only slight solvent action on the sheeting, drying the coating, and fixing the coating to the sheeting by applying a solvent over the coating which has good solvent action for both the sheeting and the coating.

7. The method of forming colored cellulose acetate sheeting which comprises applying to the sheeting a cellulose nitrate base coating containing titanium dioxide in a solvent which has only slight solvent action on the sheeting, drying the coating, and fixing the coating to the sheeting by applying a solvent over the coating which has a good solvent action upon both the sheeting and the coating.

8. The method of forming colored cellulose acetate sheeting which comprises applying to the sheeting a cellulose nitrate base coating containing titanium dioxide in a solvent which has only slight solvent action on the sheeting, drying the coating and protecting and fixing the coating to the sheeting by applying a cellulose nitrate solution over the coating, the solvent of which has good solvent action for the sheeting and the coating and the cellulose nitrate base of which covers the titanium dioxide layer.

9. The method of forming colored cellulose derivative sheeting which comprises coating the sheeting by applying thereto a coloring material in a solvent mixture containing a high boiling solvent and having only slight solvent action on the sheeting, drying the coating, and fixing the coating to the sheeting by wetting the coated sheeting with a low boiling solvent which has solvent action for both the sheeting and the coating.

10. The method of forming colored cellulose ester sheeting which comprises applying to the sheeting a cellulose nitrate base coating containing titanium dioxide in a solvent mixture including a high boiling solvent, drying the coating, and fixing the coating to the sheeting by applying a low boiling solvent over the coating which has a good solvent action upon both the sheeting and coating.

11. The method of forming colored cellulose ester sheeting which comprises applying to the sheeting a coating containing a dye in a solvent mixture including a high boiling solvent, drying the coating, and fixing the coating to the sheeting by applying a low boiling solvent over the dyed coating which has a good solvent action upon the sheeting and the coating.

12. The continuous method of forming colored cellulose derivative sheeting which comprises continuously coating the sheeting by applying thereto a coloring material in a solvent which has moderate solvent action on the sheeting, continuously drying the coating, fixing the coating to the sheeting by continuously wetting the coated sheeting with a solvent which has pronounced solvent action for both the sheeting and the coating whereby the coating is firmly attached to the sheeting and then again drying the sheeting.

13. The continuous method of forming colored cellulose derivative sheeting which comprises continuously coating the sheeting by applying thereto a coloring material in a solvent mixture containing a high boiling solvent having slight solvent action on the sheeting, whereby the coating is superficially attached to the sheeting continuously drying the coating, and then fixing the coating to the sheeting by continuously wetting the coated sheeting with a low boiling solvent which has active solvent action for both the sheeting and the coating whereby the coating is firmly attached to the sheeting and then continuously drying the sheeting.

MAURICE L. PIKER.